(12) United States Patent
Lo et al.

(10) Patent No.: US 11,740,847 B2
(45) Date of Patent: Aug. 29, 2023

(54) IMAGE FORMING SYSTEM THAT TRANSMITS PRINT JOB TO TRANSFER DESTINATION DETERMINED OUT OF PLURALITY OF IMAGE FORMING APPARATUSES, AND IMAGE FORMING METHOD

(71) Applicant: KYOCERA Document Solutions Inc., Osaka (JP)

(72) Inventors: Jason Bernard Lo, Osaka (JP); Alcuin Allan Andrade, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 17/891,700

(22) Filed: Aug. 19, 2022

(65) Prior Publication Data
US 2023/0059211 A1    Feb. 23, 2023

(30) Foreign Application Priority Data

Aug. 20, 2021 (JP) .................................. 2021-134935

(51) Int. Cl.
*G06F 3/12* (2006.01)

(52) U.S. Cl.
CPC .......... *G06F 3/1275* (2013.01); *G06F 3/1207* (2013.01); *G06F 3/1211* (2013.01); *G06F 3/1263* (2013.01); *G06F 3/1267* (2013.01); *G06F 3/1288* (2013.01)

(58) Field of Classification Search
CPC .... G06F 3/1207; G06F 3/1288; G06F 3/1263; G06F 3/1211; G06F 3/1275
See application file for complete search history.

(56) References Cited

U.S. PATENT DOCUMENTS

| | | | | |
|---|---|---|---|---|
| 6,947,156 B1* | 9/2005 | Jeyachandran | ........... | G06F 3/00 358/1.15 |
| 2004/0061890 A1* | 4/2004 | Ferlitsch | ................. | G06F 3/126 358/1.15 |
| 2004/0179230 A1* | 9/2004 | Kitada | ............... | H04N 1/00954 358/1.15 |
| 2007/0182988 A1* | 8/2007 | Maeda | .................. | G06F 3/1208 358/1.15 |

(Continued)

FOREIGN PATENT DOCUMENTS

JP          2016150528 A      8/2016

*Primary Examiner* — John R Wallace

(57) ABSTRACT

An image forming system includes a terminal device, a management apparatus, and a plurality of image forming apparatuses. The terminal device includes a first controller that generates a print job, and transmits the print job to the management apparatus. The management apparatus includes a storage queue, and a second controller that stores the print job in the storage queue upon receipt thereof, determines one of the image forming apparatuses that completes a printing operation based on the print job most rapidly, as transfer destination, on a basis of printing ability of each of the image forming apparatuses, and transmits the print job to the image forming apparatus determined as the transfer destination. The image forming apparatuses each include an image forming device, and a third controller that causes the image forming device to execute the printing operation based on the print job, upon receipt thereof.

9 Claims, 18 Drawing Sheets

(56) References Cited

U.S. PATENT DOCUMENTS

| | | | |
|---|---|---|---|
| 2009/0303502 A1* | 12/2009 | Robinson | G06Q 10/06315 358/1.9 |
| 2010/0074633 A1* | 3/2010 | Kuwasaki | G03G 15/5079 399/81 |
| 2017/0134606 A1* | 5/2017 | Kim | H04N 1/00307 |

* cited by examiner

Fig.4

| ID NUMBER | APPA-RATUS NAME | IP ADDRESS | PERFORMANCE | | | ... | LOCATION | CURRENT STATUS |
|---|---|---|---|---|---|---|---|---|
| | | | PRINT SPEED (PAGES/MIN) | | MAXIMUM SHEET SIZE | | | |
| | | | COLOR | B/W | | | | |
| 0001 | TF40 | 10.191.21.95 | 40 | 40 | A3 | ... | aaaaaa | wwwwwwww |
| 0002 | TM50 | 10.191.21.204 | — | 50 | A3 | ... | bbbbbb | xxxxxxxx |
| 0003 | EF55 | 10.191.21.196 | 40 | 55 | A4 | ... | cccccc | yyyyyyyy |
| 0004 | EM60 | 10.191.21.204 | — | 60 | A4 | ... | dddddd | zzzzzzzz |

331

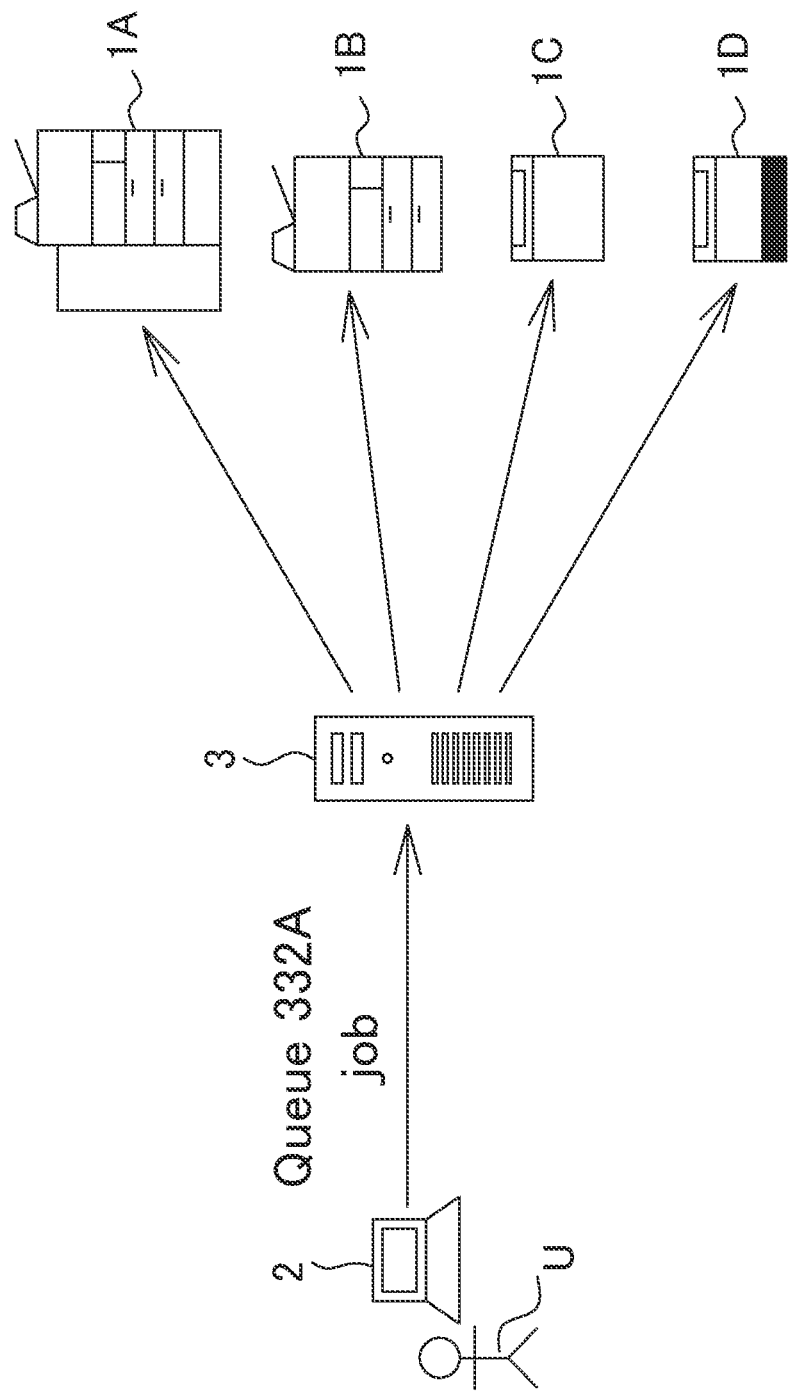

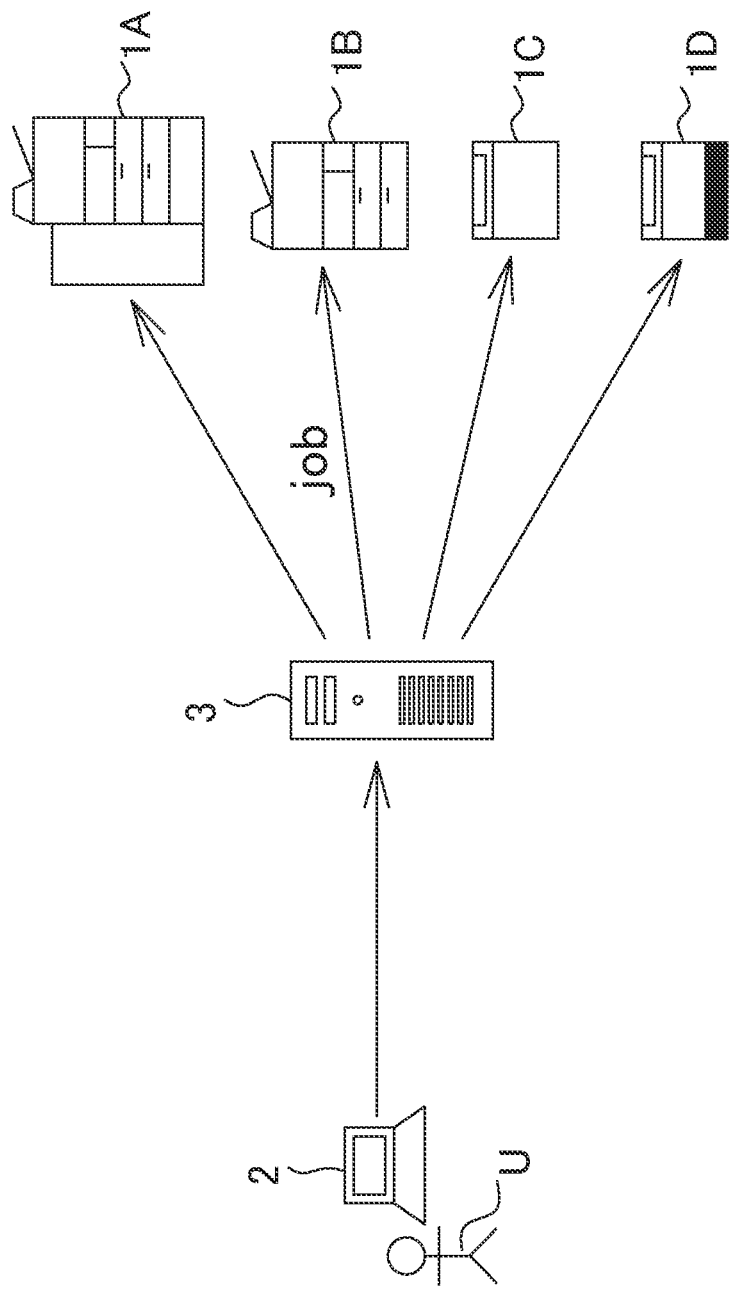

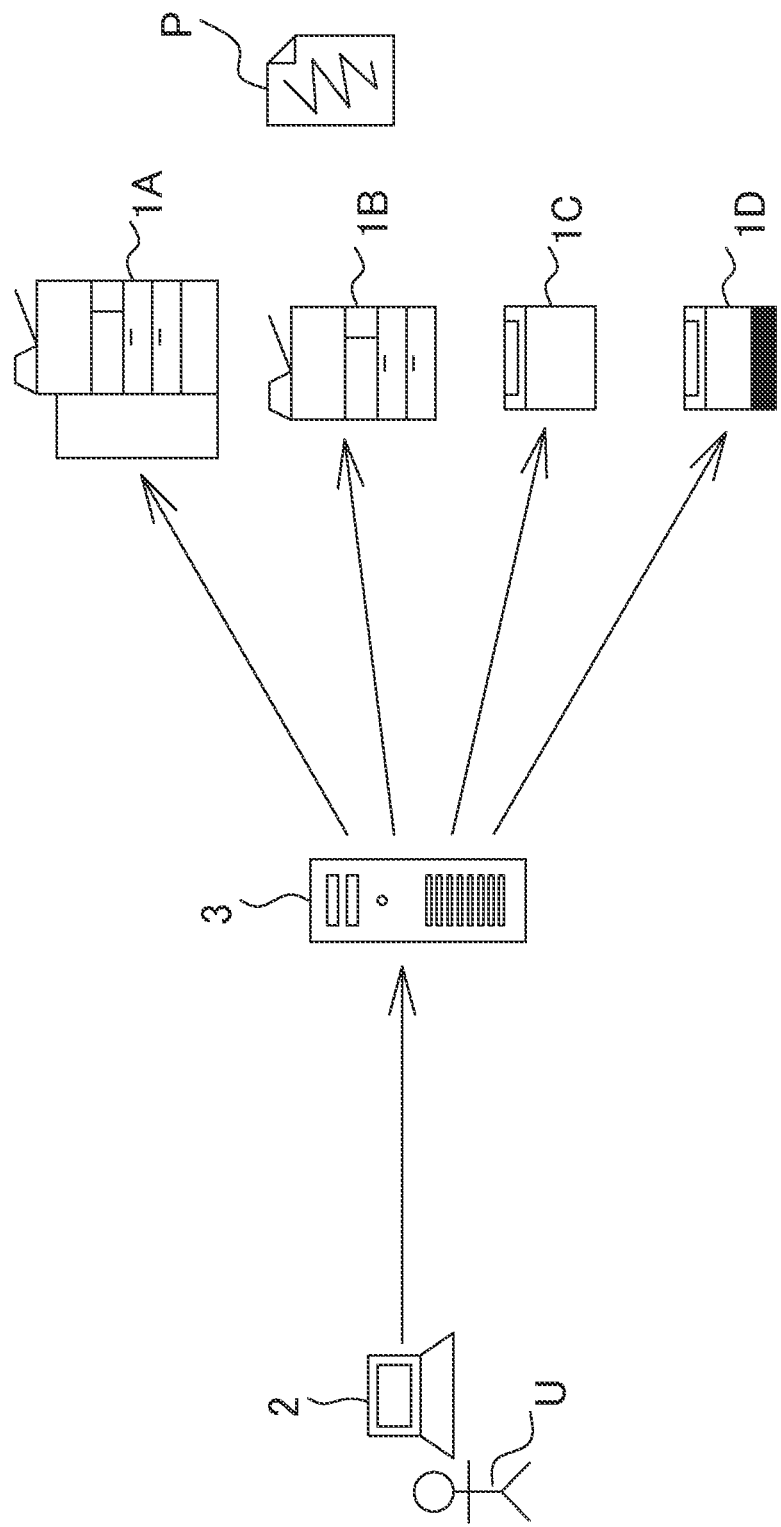

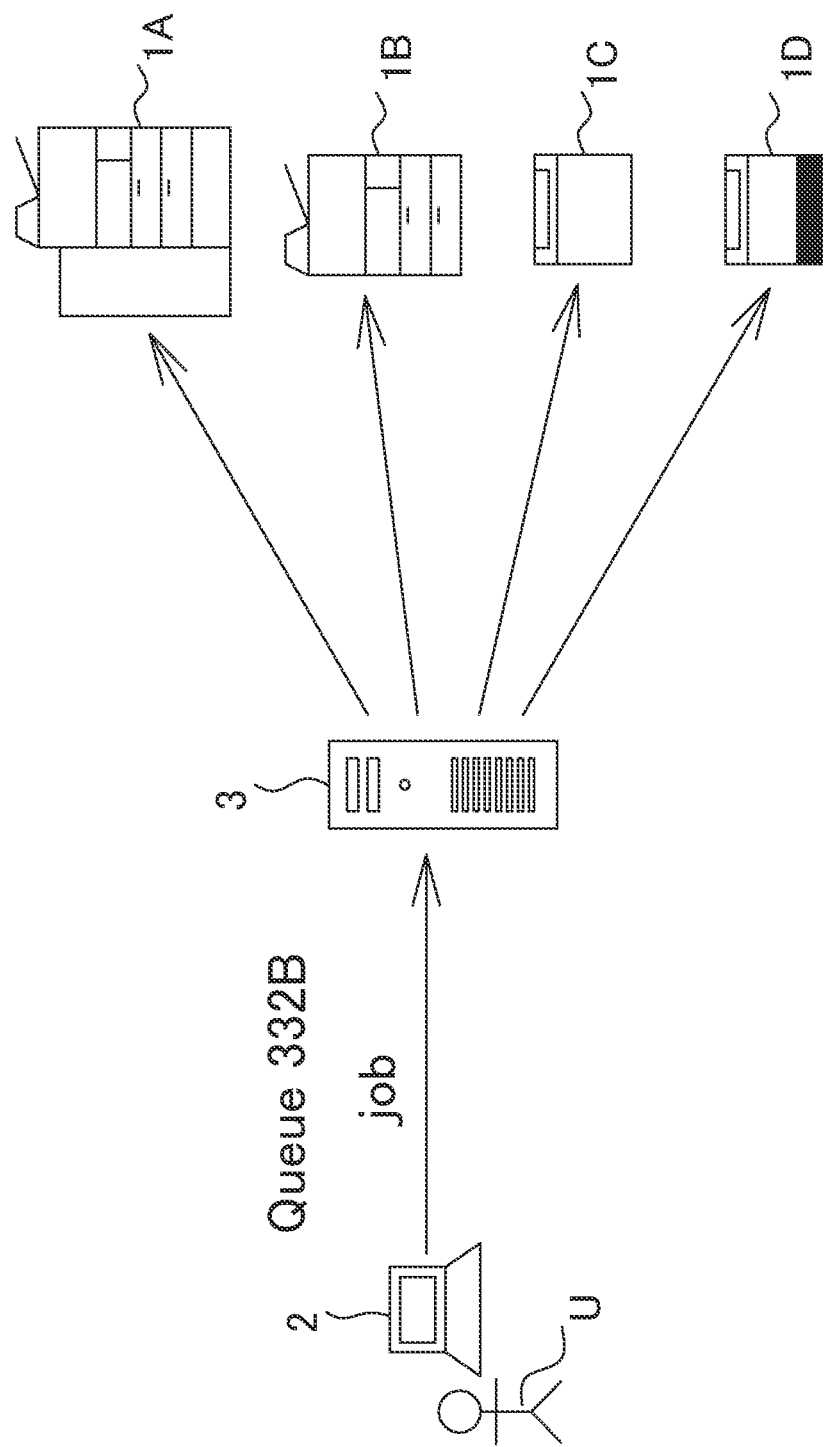

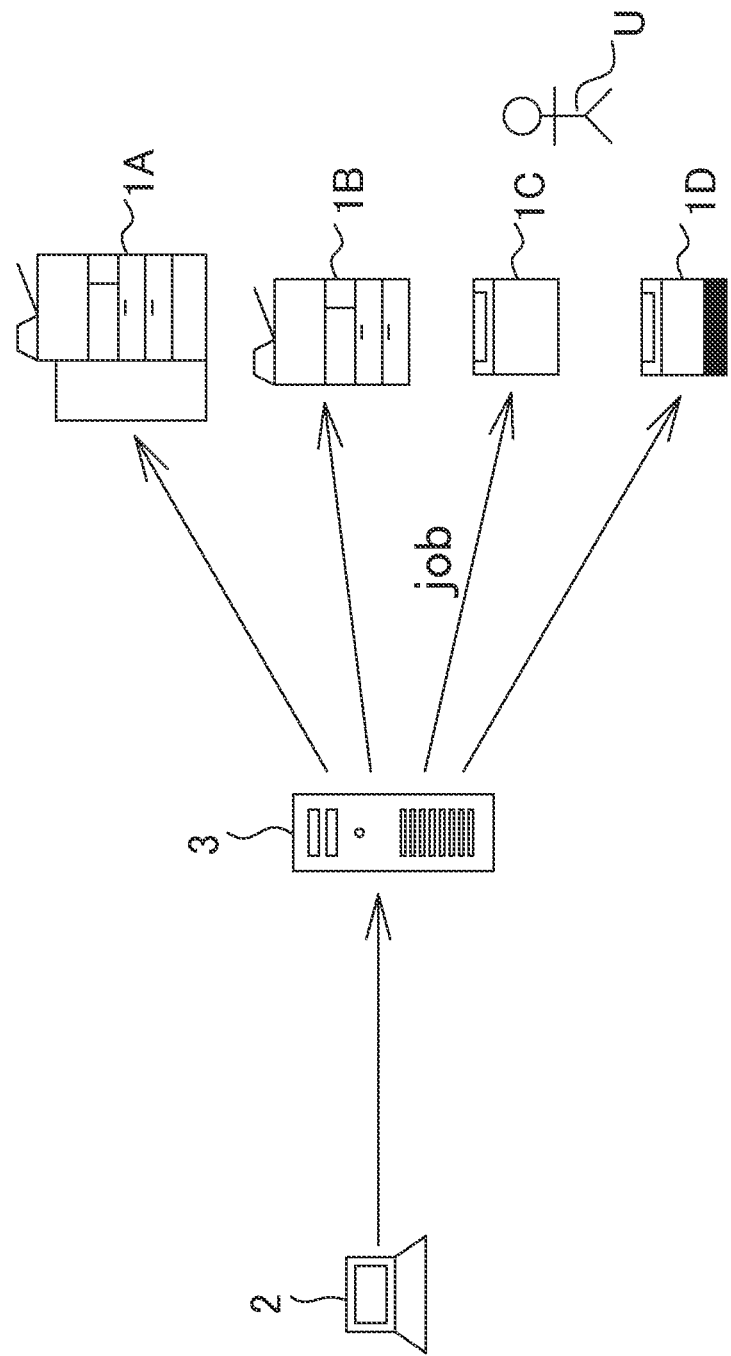
Fig.6B  <PATTERN 2> PRINT & FOLLOW(Print & follow)

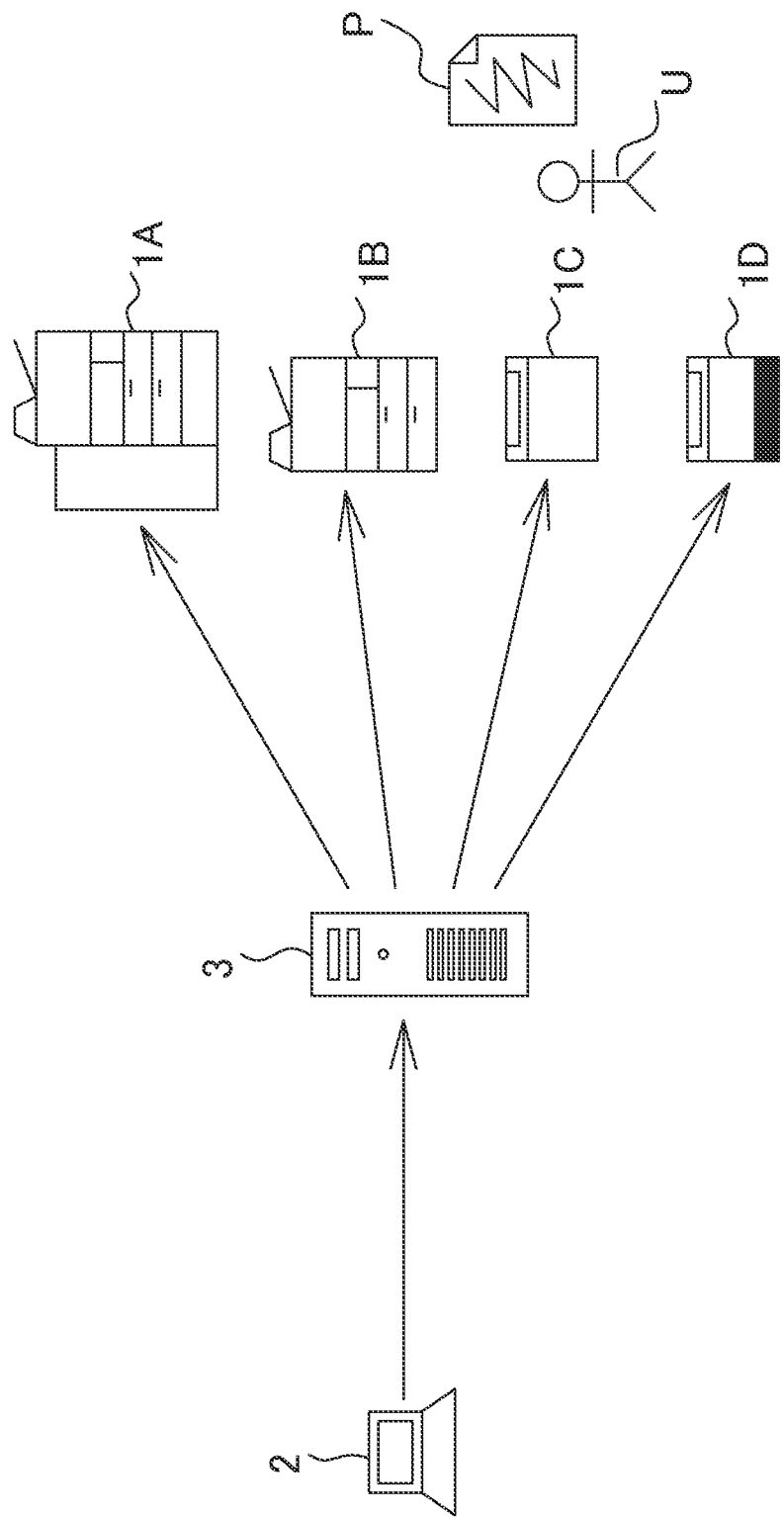

<PATTERN 3> PPM-BASED PRINTING (PPM Based Printing)

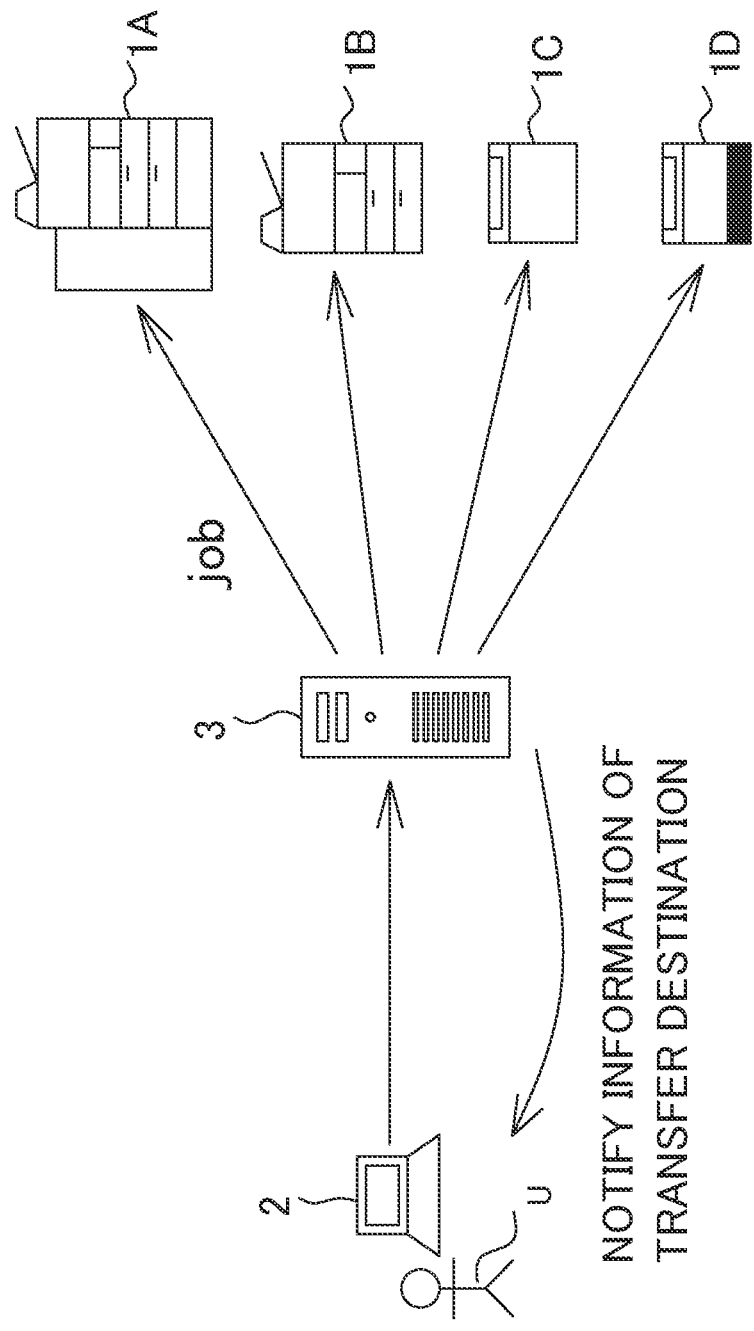

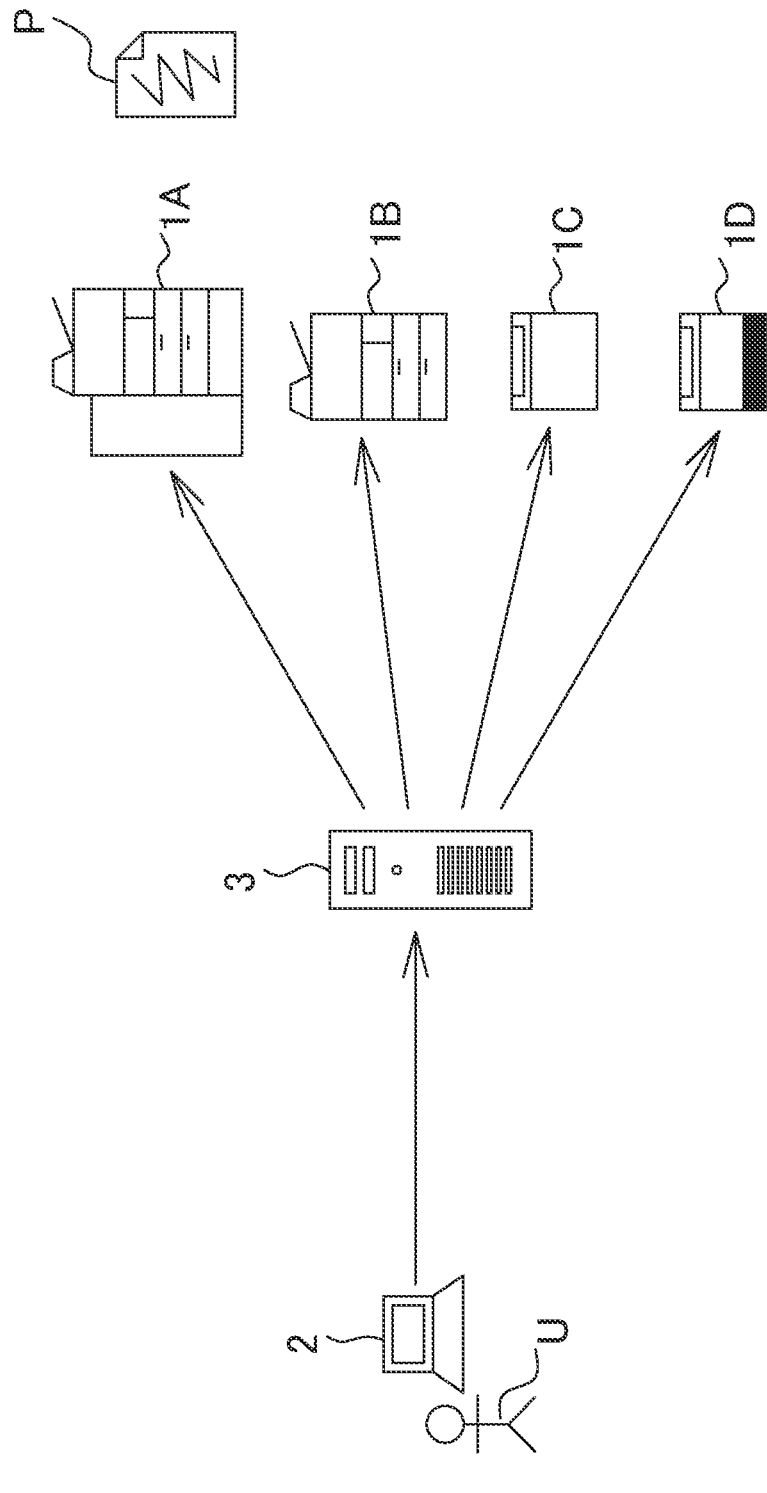

Fig.11

YOUR PRINT JOB HAS BEEN NORMALLY TRANSMITTED TO PRINTING DEVICE, AND WILL BE PRINTED.

DEVICE INFORMATION

PRINT SPEED (PAGES/MIN): 60

IP ADDRESS: 10.191.21.204

LOCATION: 15TH FLOOR, SIXTH LABORATORY

PRINT JOB DETAIL

TITLE: SampleTestDoc123.docx

NUMBER OF PAGES: 80

IMAGE FORMING SYSTEM THAT TRANSMITS PRINT JOB TO TRANSFER DESTINATION DETERMINED OUT OF PLURALITY OF IMAGE FORMING APPARATUSES, AND IMAGE FORMING METHOD

INCORPORATION BY REFERENCE

This application claims priority to Japanese Patent Application No. 2021-134935 filed on Aug. 20, 2021, the entire contents of which are incorporated by reference herein.

BACKGROUND

The present disclosure relates to a technique to transmit a print job generated by a terminal device to an image forming apparatus, through the intermediation of a management apparatus.

Various types of image forming systems, including a terminal device that generates and transmits a print job and a plurality of image forming apparatuses, have thus far been proposed, and put to practical use. For example, a technique to transmit the print job to an image forming apparatus that is most likely to be utilized by a user, is widely known.

SUMMARY

The disclosure proposes further improvement of the foregoing techniques.

In an aspect, the disclosure provides an image forming system including a terminal device, a management apparatus, and a plurality of image forming apparatuses. The terminal device includes a first communication device and a first control device. The first communication device communicates with the management apparatus. The first control device includes a processor, and acts as a print controller when the processor executes a first control program. The print controller generates a print job based on a document to be printed, and transmits the print job to the management apparatus, via the first communication device. The management apparatus includes a second communication device, a storage queue, and a second control device. The second communication device communicates with the terminal device and the plurality of image forming apparatuses. The second control device includes a processor, and acts as a transferer when the processor executes a second control program. The transferer stores, upon receipt of the print job transmitted from the terminal device via the second communication device, the print job in the storage queue, and performs a first transfer operation including determining one of the plurality of image forming apparatuses that completes a printing operation based on the print job most rapidly, as transfer destination, on a basis of printing ability of each of the plurality of image forming apparatuses, and transmitting the print job to the image forming apparatus determined as the transfer destination, via the second communication device. The plurality of image forming apparatuses each include a third communication device, an image forming device, and a third control device. The third communication device communicates with the management apparatus. The image forming device executes the printing operation including forming an image on a recording medium. The third control device includes a processor, and acts as a controller when the processor executes a third control program. The controller causes the image forming device, upon receipt of the print job transmitted from the management apparatus via the third communication device, to execute the printing operation based on the print job.

In another aspect, the disclosure provides an image forming method to be executed by an image forming system including a terminal device, a plurality of image forming apparatuses, and a management apparatus. The image forming method includes a step in which the terminal device generates a print job based on a document to be printed, and transmits the print job to the management apparatus, via a first communication device that communicates with the management apparatus, a step in which the management apparatus receives the print job transmitted from the terminal device, via a second communication device that communicates with the terminal device and the plurality of image forming apparatuses, and stores the print job in a storage queue, a step in which the management apparatus performs a first transfer operation including determining one of the plurality of image forming apparatuses that completes a printing operation based on the print job most rapidly, as transfer destination, on a basis of printing ability of each of the plurality of image forming apparatuses, and transmitting the print job to the image forming apparatus determined as the transfer destination, via the second communication device, and a step in which the image forming apparatus determined as the transfer destination receives the print job transmitted from the management apparatus, via a third communication device that communicates with the management apparatus, and causes an image forming device that executes the printing operation including forming an image on a recording medium, to execute the printing operation based on the print job.

BRIEF DESCRIPTION OF THE DRAWINGS

FIG. 4 is a table showing an example of data structure stored in a device information storage region;

FIG. 5A to FIG. 5C are schematic drawings sequentially showing an operation performed when a print job is stored in a storage queue to which a "Direct Printing" function is assigned;

FIG. 6A to FIG. 6C are schematic drawings sequentially showing an operation performed when a print job is stored in a storage queue to which a "Print & Follow" function is assigned;

FIG. 7A to FIG. 7C are schematic drawings sequentially showing an operation performed when a print job is stored in a storage queue to which a "PPM-Based Printing" function is assigned;

FIG. 11 is a schematic drawing showing an example of a notice; and

DETAILED DESCRIPTION

Figure 1:
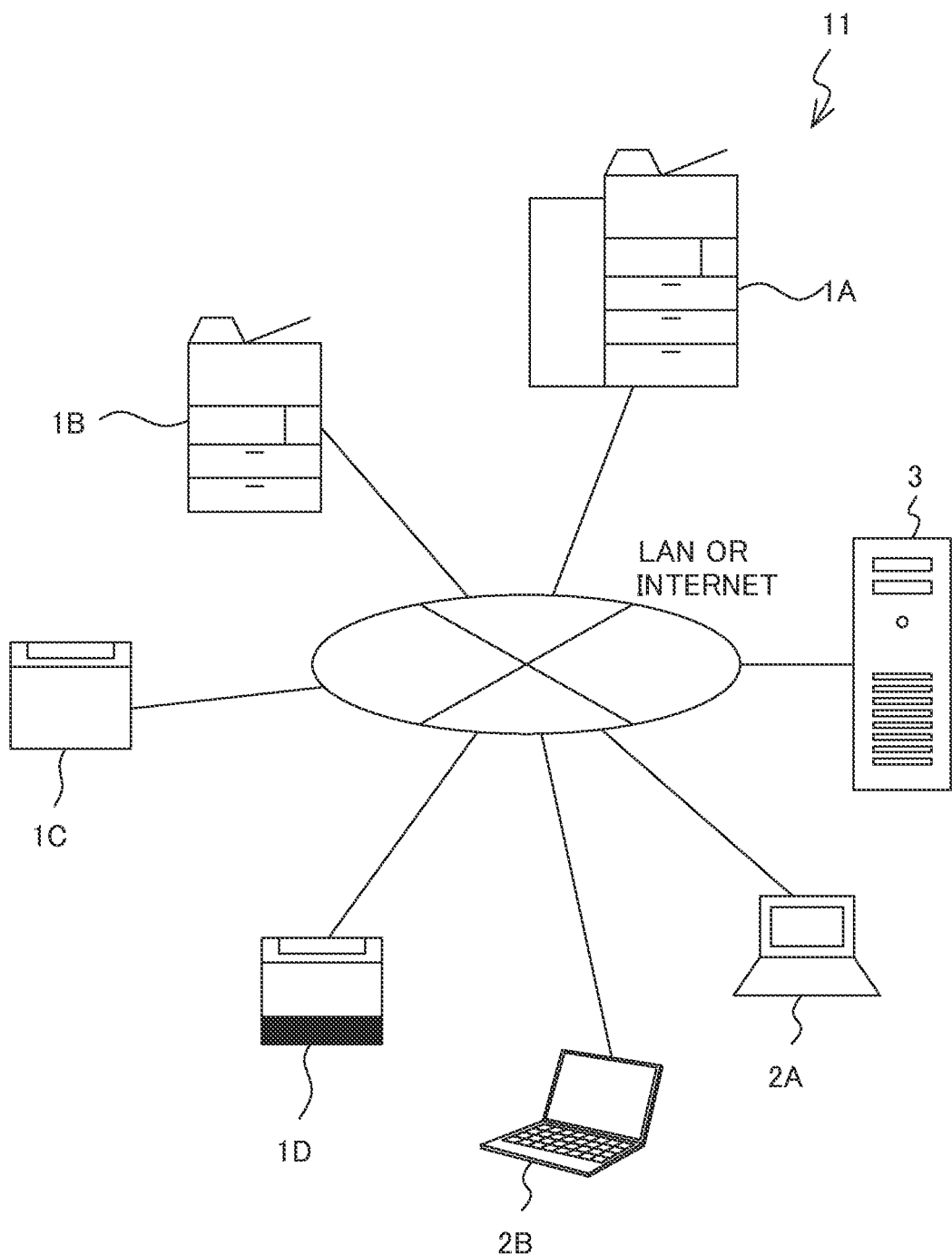
FIG. 1 is a schematic diagram showing a general configuration of an image forming system according to an embodiment of the disclosure.

Hereafter, an image forming system and an image forming method according to an embodiment of the disclosure will be described, with reference to the drawings. FIG. 1 illustrates a general configuration of the image forming system 11 according to the embodiment of the disclosure.

The image forming system 11 includes a plurality of image forming apparatuses 1A to 1D (hereinafter collectively "image forming apparatus 1", where appropriate), a plurality of terminal devices 2A and 2B (hereinafter collectively "terminal device 2", where appropriate) and a management apparatus 3, located on a network such as the internet. The image forming apparatus 1 is a multifunction peripheral having a plurality of functions, such as copying, printing, scanning, and facsimile transmission, or a printer only having the printing function.

The terminal device 2 is, for example, a personal computer (PC). The terminal device 2 includes a printer driver configured to generate a print job on the basis of a document to be printed, and transmit the generated print job to the management apparatus 3.

The management apparatus 3 is, for example, a server. The management apparatus 3 relays the communication between the terminal device 2 and the image forming apparatus 1. The management apparatus 3 temporarily stores the print job, for example transmitted from the terminal device 2, and transfers the print job to the image forming apparatus 1.

Figure 2:
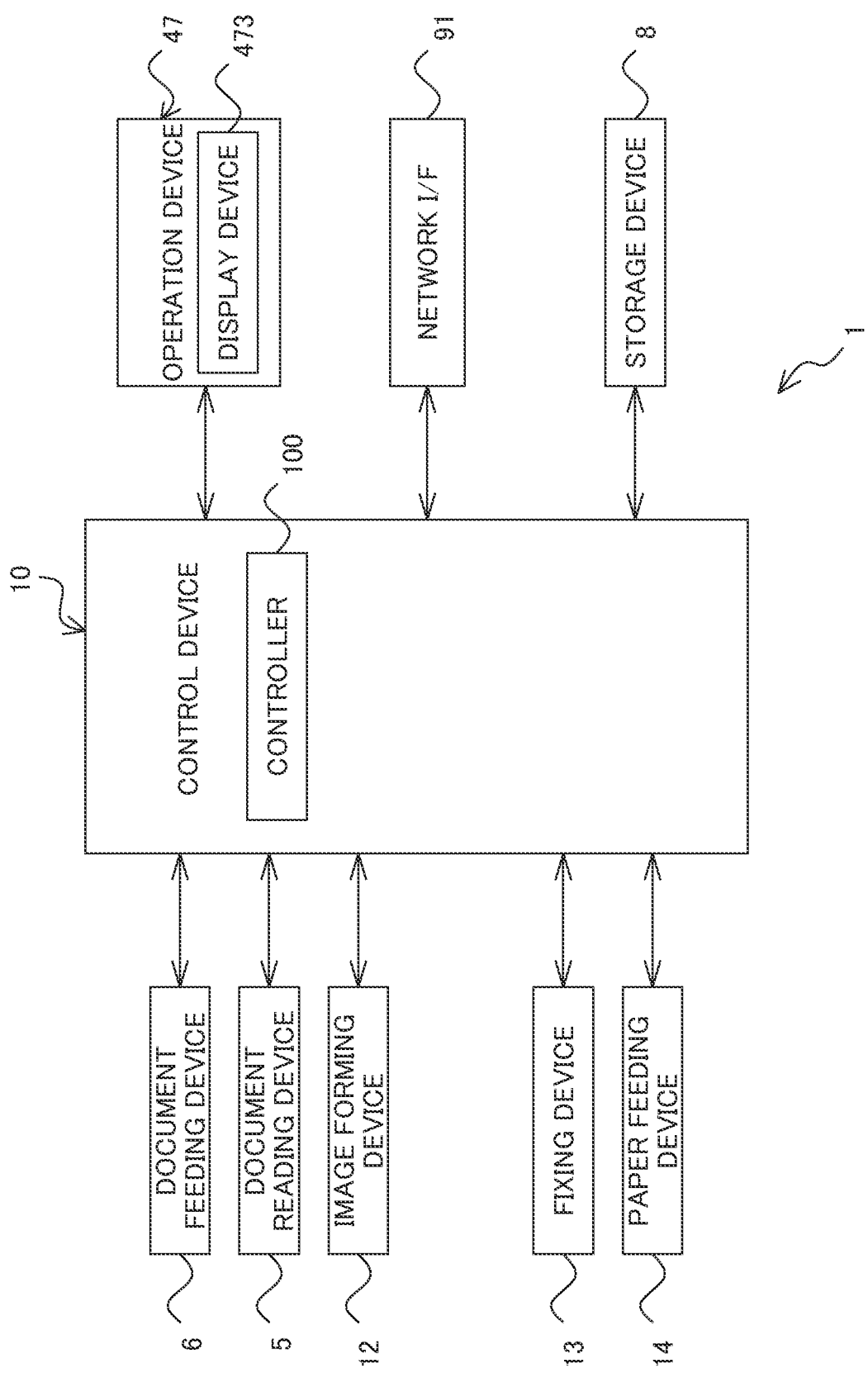
FIG. 2 is a functional block diagram schematically showing an essential internal configuration of an image forming apparatus.

FIG. 2 is a functional block diagram schematically showing an essential internal configuration of the image forming apparatus 1. The image forming apparatus 1 includes a control device 10, a document feeding device 6, a document reading device 5, an image forming device 12, a fixing device 13, a paper feeding device 14, an operation device 47, a network interface (I/F) 91, and a storage device 8.

The document feeding device 6 is openably connected to the upper face of the document reading device 5, for example via a hinge. The document feeding device 6 serves as a document retention cover, when the document reading device 5 reads a source document placed on the platen glass. The document feeding device 6 is an automatic document feeder, abbreviated as ADF. The document feeding device 6 includes a document tray, and delivers the source documents placed thereon to the document reading device 5.

To perform the document reading operation, the image forming apparatus 1 operates as follows. The document reading device 5 optically reads the image on the source document delivered from the document feeding device 6 to the document reading device 5, or placed on the platen glass, and generates image data. The image data generated by the document reading device 5 is stored, for example, in an image memory.

To perform the image forming operation, the image forming apparatus 1 operates as follows. The image forming device 12 forms a toner image on a recording sheet, exemplifying the recording medium in the disclosure, and delivered from the paper feeding device 14, on the basis of the image data generated through the document reading operation, or image data received from an external device such as a computer, connected via the network.

The fixing device 13 heats and presses the recording sheet on which the toner image has been formed by the image forming device 12, to thereby fix the toner image on the recording sheet. The recording sheet that has undergone the fixing process is delivered to an output tray. The paper feeding device 14 includes a paper cassette.

The storage device 8 is a large-capacity storage device such as a hard disk drive (HDD) and a solid state drive (SSD). The storage device 8 contains various control programs.

The operation device 47 receives the user's instructions to execute the functions and operations that the image forming apparatus 1 is configured to perform, such as the image forming operation. The operation device 47 includes a display device 473 for displaying, for example, an operation guide for the user. The operation device 47 receives, through a touch panel provided on the display device 473, the user's instruction based on the touch operation performed by the user on the operation screen displayed on the display device 473, or on a physical key.

The display device 473 includes, for example, a liquid crystal display (LCD). The display device 473 includes the touch panel. When the user touches a button or a key displayed on the screen, the touch panel receives the instruction corresponding to the touched position.

The network I/F 91 is a communication interface that transmits and receives various types of data to and from an external device (e.g., management apparatus 3) inside a local area, or on the internet.

The control device 10 includes a processor, a random-access memory (RAM), a read-only memory (ROM), and an exclusive hardware circuit. The processor is, for example, a central processing unit (CPU), an application specific integrated circuit (ASIC), or a micro processing unit (MPU).

The control device 10 acts as a controller 100, when the processor operates according to a control program stored in the storage device 8. Here, the controller 100 may be constituted in the form of a hardware circuit, instead of being realized by the operation of the control device 10 according to the control program. This also applies to other embodiments, unless otherwise specifically noted.

The controller 100 serves to control the overall operation of the image forming apparatus 1. The controller 100 is connected to the document feeding device 6, the document reading device 5, the image forming device 12, the fixing device 13, the paper feeding device 14, the operation device 47, the network I/F 91, and the storage device 8, and controls the operation of the mentioned components. For example, the controller 100 controls the image forming device 12 so as to execute the printing operation, according to the print job received from the management apparatus 3, thereby generating a printed material.

Figure 3:
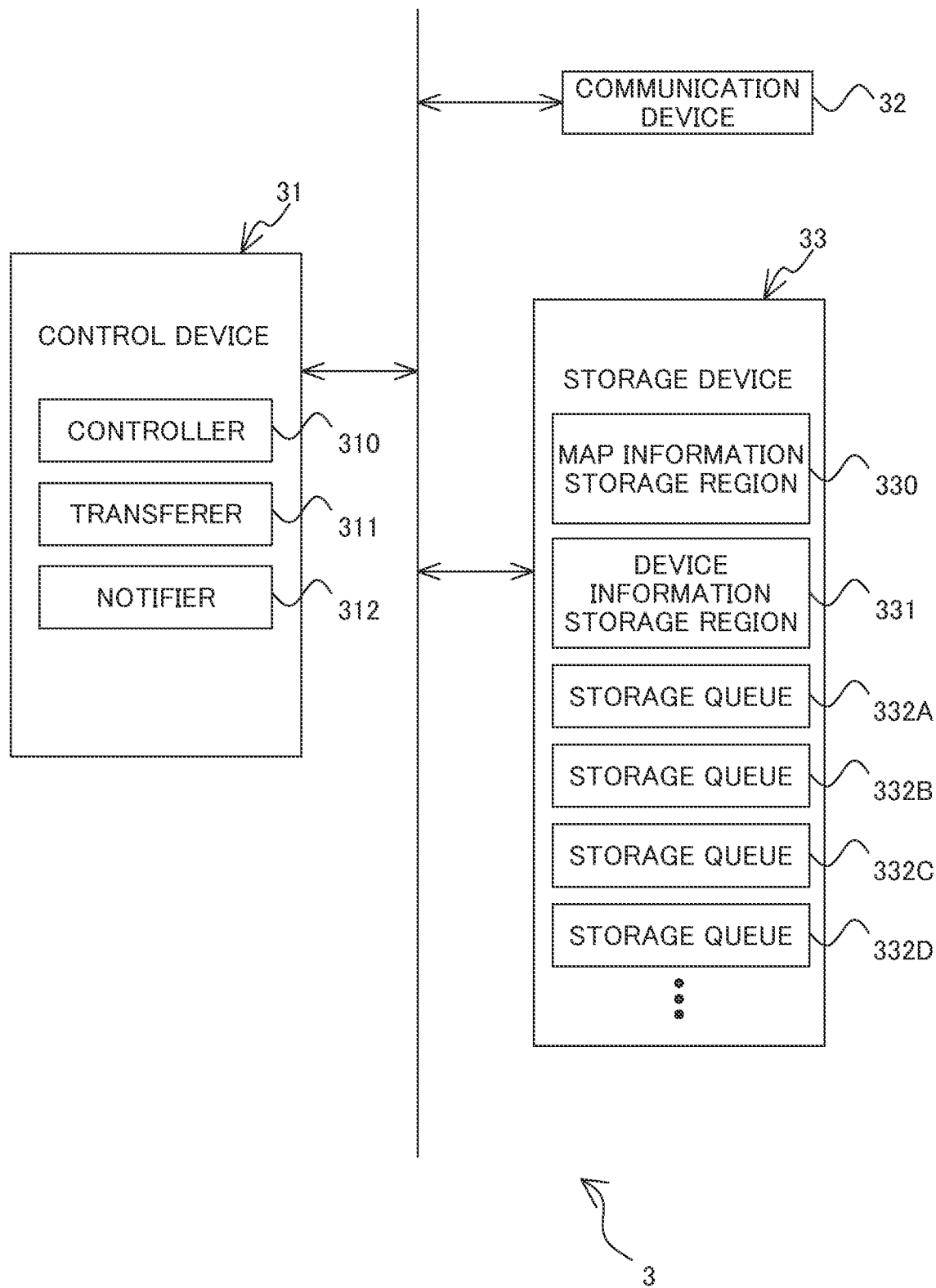
FIG. 3 is a functional block diagram schematically showing an essential internal configuration of a management apparatus.

FIG. 3 is a functional block diagram schematically showing an essential internal configuration of the management apparatus 3. The management apparatus 3 includes a control device 31, a communication device 32, and a storage device 33.

The communication device 32 is a communication interface that performs data communication with an external device located inside the local area or on the internet. For example, the communication device 32 performs the data communication, with the image forming apparatus 1 or the terminal device 2.

The storage device 33 is, for example, an HDD or an SSD. The storage device 33 contains various control programs. The storage device 33 includes a map information storage region 330, a device information storage region 331, and storage queues 332A to 332D or more (hereinafter collectively "storage queue 332", where appropriate) for storing the print job transmitted from the terminal device 2. Here, the storage queue 332 constitutes a part of the memory region of the storage device 33. The storage queue 332 is, for example, a folder. In this embodiment, it will be assumed that the storage queue 332 is a folder. To each of the storage queues 332, a name for identification is assigned.

In the map information storage region 330, map information regarding the location where the image forming apparatus 1 is installed, is stored. In the device information storage region 331, device information of the image forming apparatus 1 connected to the management apparatus 3 via the network is stored. FIG. 4 illustrates an example of data structure stored in the device information storage region 331.

The device information storage region 331 contains the information indicating the name, the IP address, the ability, the location, and the current status of each of the image forming apparatuses 1, in association with ID numbers for identifying the respective image forming apparatuses 1. The ability of the image forming apparatus 1 includes the print speed and the maximum acceptable size of the sheet. The information indicating the current status includes, for example, the information of the print job scheduled to be executed by the image forming apparatus 1. Such device information is transmitted from the image forming apparatus 1, periodically or randomly. A controller 310 to be subsequently described updates the information stored in the device information storage region 331, each time the communication device 32 receives the device information.

For example a transferer 311 of the management apparatus 3, to be subsequently described, recognizes that, for example, the name of the image forming apparatus 1, to which the ID number "0001" is assigned, is "TF40", the IP address is "10.191.21.95", the color print speed is "40 pages per minute", the B/W print speed is "40 pages per minute", and that the maximum acceptable size of the sheet is "A3", on the basis of the information stored in the device information storage region 331.

For example a notifier 312 of the management apparatus 3, to be subsequently described, is capable of acquiring the information regarding the installation location of the image forming apparatus 1, on the basis of the information indicating the location (e.g., coordinate location) stored in the device information storage region 331, and the map information stored in the map information storage region 330. The notifier 312 of the management apparatus 3 acquires, for example, the information indicating "15th floor, 6th laboratory", as the information of the location where the image forming apparatus 1 is installed.

The control device 31 includes a processor, a RAM, a ROM, and an exclusive hardware circuit. The processor is, for example, a CPU, an ASIC, or an MPU. The control device 31 acts as a controller 310, a transferer 311, and a notifier 312, when the processor operates according to a control program stored in the storage device 33.

The controller 310 serves to control the overall operation of the management apparatus 3. The controller 310 is connected to the communication device 32 and the storage device 33, to control the operation of these components, and to transmit and receive signals or data to and from these components.

The transferer 311 performs a transfer operation, including storing the print job transmitted from the terminal device 2 in the storage queue 332, and transmitting the print job stored in the storage queue 332 to the image forming apparatus 1.

The notifier 312 notifies the information about the installation location of the image forming apparatus 1 that is the transfer destination of the print job, to the user of the terminal device 2. For example, the notifier 312 causes the communication device 32 to transmit the mentioned information, to the mail address registered in advance in association with the user.

The transferer 311 designates one or more image forming apparatuses 1, as prospective transfer destination of the print job stored in the storage queue 332, in association with each of the storage queues 332. The transferer 311 executes one of a plurality of predetermined transfer functions, with respect to the print job stored in the storage queue 332. For such purpose, the transferer 311 assigns one of the plurality of transfer functions to each of the storage queues 332, in association with each other. The difference in transfer function affects the printing procedure. The transfer functions include, for example, the following three patterns. Referring to FIG. 5 to FIG. 8, the transfer function will be described hereunder.

Pattern 1: "Direct Printing"

FIG. 5A to FIG. 5C sequentially illustrates an operation performed when the print job is stored in the storage queue 332 to which a "Direct Printing" function is assigned. In this case, it will be assumed that, with respect to the storage queue 332A, the transferer 311 has designated the image forming apparatus 1B as the transfer destination of the print job stored in the storage queue 332A, along with the "Direct Printing" function.

Referring to FIG. 5A, when the user U performs a predetermined operation on the operation device 22 of the terminal device 2, so as to store the print job ("job" in FIG. 5A) in the storage queue 332A, the controller 210 of the terminal device 2 transmits an instruction to store the print job in the storage queue 332A, and the print job, to the management apparatus 3 via the communication device 24.

In the management apparatus 3, the transferer 311 stores the print job received via the communication device 32 in the storage queue 332A, according to the instruction. The transferer 311 transmits, as shown in FIG. 5B, the print job stored in the storage queue 332A to the image forming apparatus 1B, which is the transfer destination registered in advance in the storage queue 332A, via the communication device 32. In the image forming apparatus 1B, the controller 100 causes the image forming device 12, upon receipt of the print job via the network I/F 91, to execute the printing operation based on the received print job, thereby creating a printed material P, as shown in FIG. 5C.

Pattern 2: "Print & Follow"

FIG. 6A to FIG. 6C sequentially illustrates an operation performed when the print job is stored in the storage queue 332 to which a "Print & Follow" function is assigned. In this case, it will be assumed that, with respect to the storage queue 332B, the transferer 311 has designated the image forming apparatuses 1B to 1D as the prospective transfer destination of the print job stored in the storage queue 332B, along with the "Print & Follow" function.

Referring to FIG. 6A, when the user U performs a predetermined operation on the operation device 22 of the terminal device 2, so as to store the print job ("job" in FIG. 6A) in the storage queue 332B, the controller 210 of the terminal device 2 transmits the instruction to store the print job in the storage queue 332B, and the print job, to the management apparatus 3 via the communication device 24.

In the management apparatus 3, the transferer 311 stores the print job received via the communication device 32 in the storage queue 332B, according to the instruction.

Regarding the acquisition of the print job stored in the storage queue 332B, one of the image forming apparatuses 1B to 1D, designated as the prospective transfer destination from the storage queue 332B, may make a request for the print job.

For example, when the user U performs a predetermined operation on the operation device 47 of the image forming apparatus 1C, to input the instruction to acquire the print job stored in the storage queue 332B, the controller 100 of the image forming apparatus 1C transmits, via the network I/F 91, the instruction to request the management apparatus 3 to transfer the print job.

Upon receipt of the mentioned request via the communication device 32, the transferer 311 of the management apparatus 3 transmits, as shown in FIG. 6B, the print job stored in the storage queue 332B to the image forming apparatus 1C, via the communication device 32. Upon receipt of the print job via the network I/F 91, the controller 100 of the image forming apparatus 1C causes the image forming device 12 to execute the printing operation based on the received print job, thereby creating the printed material P, as shown in FIG. 6C.

Pattern 3: "PPM-Based Printing"

Figure 7A:
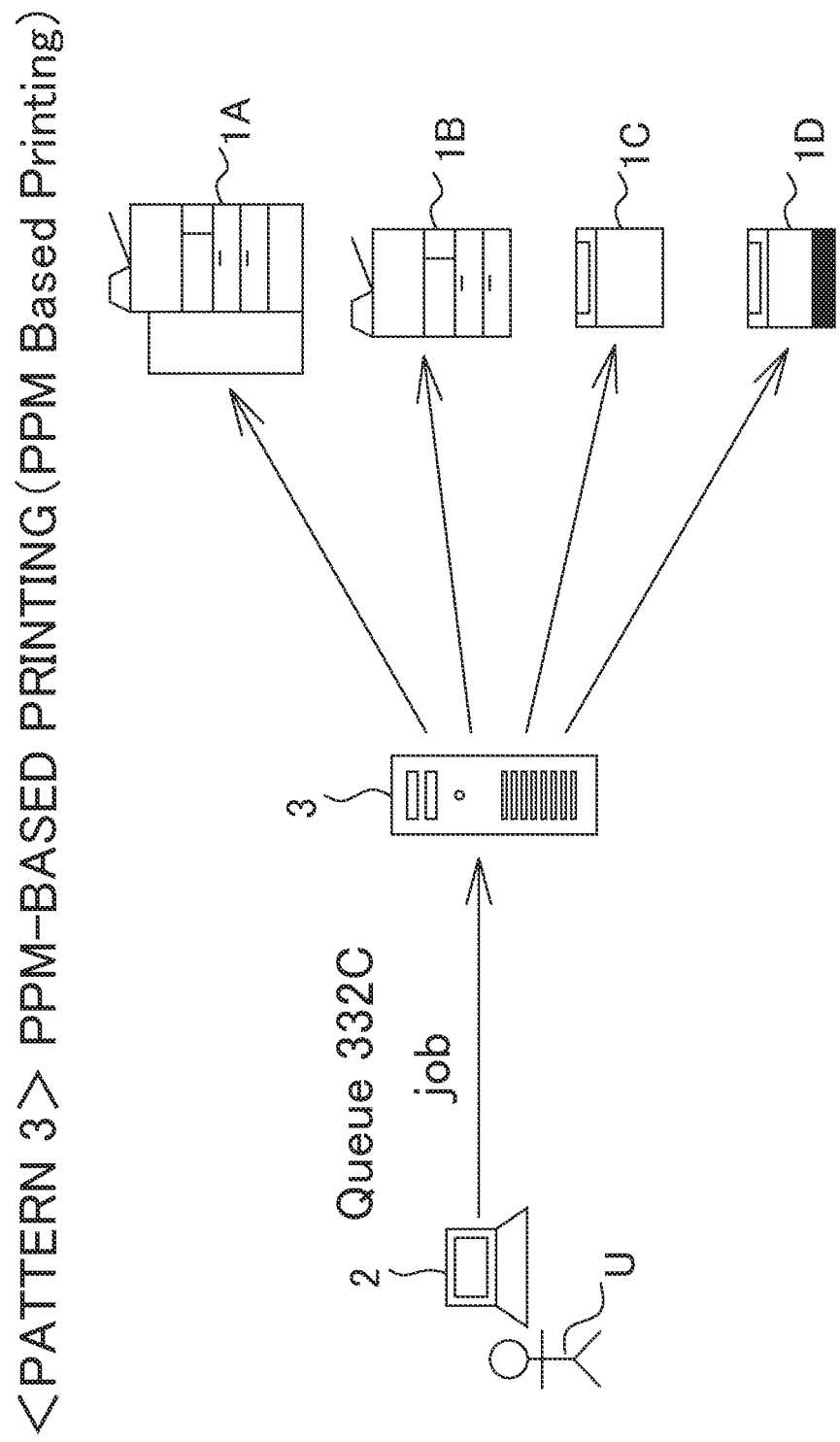

FIG. 7A to FIG. 7C sequentially illustrates an operation performed when the print job is stored in the storage queue 332 to which a "PPM-Based Printing" function is assigned. In this case, it will be assumed that, with respect to the storage queue 332C, the transferer 311 has designated the image forming apparatuses 1A to 1D as the prospective transfer destination of the print job stored in the storage queue 332C, along with the "PPM-Based Printing" function.

Referring to FIG. 7A, when the user U performs a predetermined operation on the operation device 22 of the terminal device 2, so as to store the print job ("job" in FIG. 7A) in the storage queue 332C, the controller 210 of the terminal device 2 transmits the instruction to store the print job in the storage queue 332C, and the print job, to the management apparatus 3 via the communication device 24.

In the management apparatus 3, the transferer 311 stores the print job received via the communication device 32 in the storage queue 332C, according to the instruction. The transferer 311 selects the image forming apparatus 1 that completes the printing operation based on the print job most rapidly, out of the image forming apparatuses 1A to 1D which are the prospective transfer destinations of the print job, registered in advance with respect to the storage queue 332C.

In the case of deciding that the image forming apparatus 1A completes the printing operation most rapidly among the image forming apparatuses 1, the transferer 311 transmits, as shown in FIG. 7B, the print job stored in the storage queue 332C to the image forming apparatus 1A, via the communication device 32.

The notifier 312 transmits, to the terminal device 2 via the communication device 32, a notice to the user of the terminal device 2 indicating the installation location of the image forming apparatus 1A, which is the transfer destination of the print job. Accordingly, the user U can be easily made aware which of the image forming apparatuses 1 is to create the printed material P. Upon receipt of the print job via the network I/F 91, the controller 100 of the image forming apparatus 1A causes the image forming device 12 to execute the printing operation based on the received print job, thereby creating the printed material P, as shown in FIG. 7C.

Figure 8:
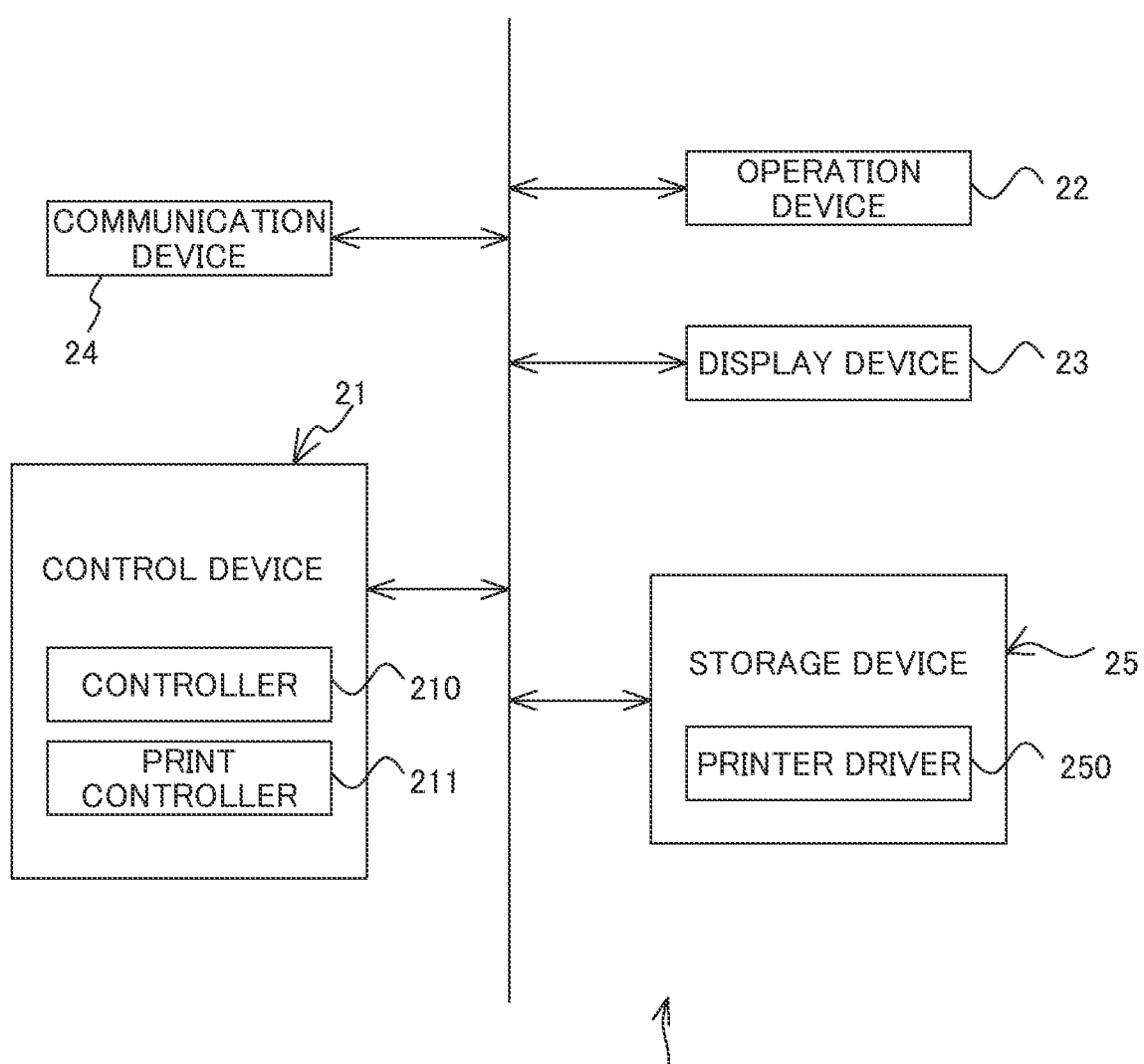
FIG. 8 is a functional block diagram schematically showing an essential internal configuration of a terminal device.

FIG. 8 is a functional block diagram schematically showing an essential internal configuration of the terminal device 2. The terminal device 2 includes a control device 21, an operation device 22, a display device 23, a communication device 24, and a storage device 25. The mentioned components can transmit and receive signals and data to and from each other, via a communication path.

The operation device 22 includes a keyboard, a mouse, and so forth. The user can input a command or a character to the control device 21, or operate a pointer on the screen of the display device 23, via the operation device 22. Thus, the operation device 22 receives the input of the user's instruction, based on the operation performed by the user. The display device 23 includes, for example, an LCD. The display device 23 displays a response or data acquired from the control device 21.

The communication device 24 is a communication interface that transmits and receives various types of data to and from an external device such as the management apparatus 3, located inside the local area or on the internet.

The storage device 25 is a large-capacity storage device such as an HDD or an SSD. The storage device 25 contains various control programs. As an example of the control programs, a printer driver 250 is installed in the terminal device 2. The storage device 25 contains the printer driver 250.

The control device 21 includes a processor, a RAM, a ROM, and an exclusive hardware circuit. The processor is, for example, a CPU, an ASIC, or an MPU. The control device 21 acts as a controller 210, when the processor operates according to a control program stored in the storage device 25.

The control device 21 also acts as a print controller 211, when the processor operates according to the printer driver 250 stored in the storage device 25. Here, the controller 210 and the print controller 211 may each be constituted in the form of a hardware circuit, instead of being realized by the operation of the control device 21 according to the control program. This also applies to other embodiments, unless otherwise specifically noted.

The controller 210 serves to control the overall operation of the terminal device 2. The controller 210 is connected to the operation device 22, the display device 23, the communication device 24, and the storage device 25, and controls the operation of the mentioned components.

The print controller 211 converts the document to be printed into print data that can be analyzed by the image forming apparatus 1, thereby generating the print job, and transmits the instruction to store the generated print job in the storage queue 332, designated by the user via the operation device 22, to the management apparatus 3 via the communication device 24. For example, the print controller 211 generates the print data, by converting the document to be printed into description in the page description language (PDL).

Figure 9:
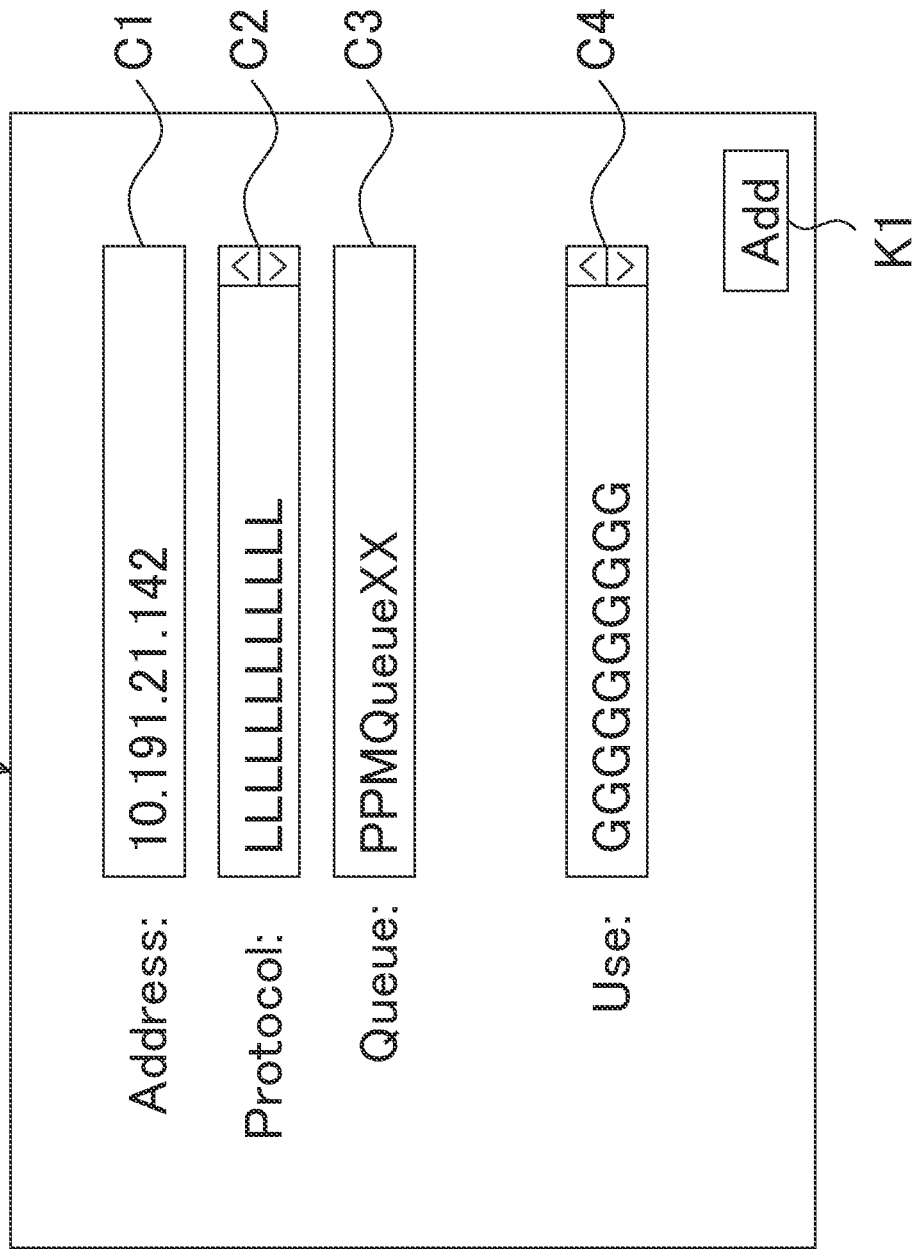
FIG. 9 is a schematic drawing showing an example of an operation screen.

The print controller 211 causes the display device 23 to display an operation screen G1 shown in FIG. 9, for designating the storage queue 332 to which the print job is to be submitted. The print controller 211 receives the designation of the storage queue 332 by the user, via the operation device 22.

To be more detailed, the print controller 211 causes the display device 23 to display, in the operation screen G1, a display field C1 (Address) for displaying the IP address of the terminal device 2, a display field C2 (Protocol) for displaying the print protocol, a display field C3 (Queue) for displaying the name of the storage queue 332 to which the print job is submitted, a display field C4 (Use) for displaying the PDL to be used, and an operation key K1 marked as "Add".

The print controller 211 causes the display device 23 to automatically display the IP address, in the display field C1. In the display fields C2 to C4, the print controller 211 causes the display device 23 to display the information inputted or selected by the user via the operation device 22. The user designates, via the operation screen G1 and the operation device 22, the print protocol, the submission destination of the print job (storage queue 332), and the PDL.

For example, when the user inputs "PPMQueueXX", which is the name of the storage queue 332, via the operation device 22 as the submission destination of the print job, the print controller 211 of the terminal device 2 transmits the instruction to store the print job in the storage queue 332C, and the print job, to the management apparatus 3 via the communication device 24.

Regarding the generation, change, or deletion of the storage queue 332, upon receipt of an input of the instruction to generate, change, or delete the storage queue 332 via the operation device 22, the print controller 211 of the terminal device 2 transmits such instruction to the management apparatus 3, via the communication device 24. In the management apparatus 3, the transferer 311 newly generates, changes, or deletes the storage queue 332, upon receipt of the instruction via the communication device 32. For example, upon receipt of an input of the name of the storage queue 332, the selected function to be assigned to the corresponding storage queue 332 (one of direct printing, print & follow, and PPM-based printing), and the image forming apparatus 1 designated as the transfer destination of the print job stored in the storage queue 332, via the operation device 22, the controller 210 of the terminal device 2 transmits the instruction reflecting the received input to the management apparatus 3, via the communication device 24. Upon receipt of the mentioned instruction transmitted from the terminal device 2 via the communication device 32, the transferer 311 of the management apparatus 3 newly generates a storage queue 332, to which the property according to the instruction is assigned, in the storage device 33.

Figure 10:
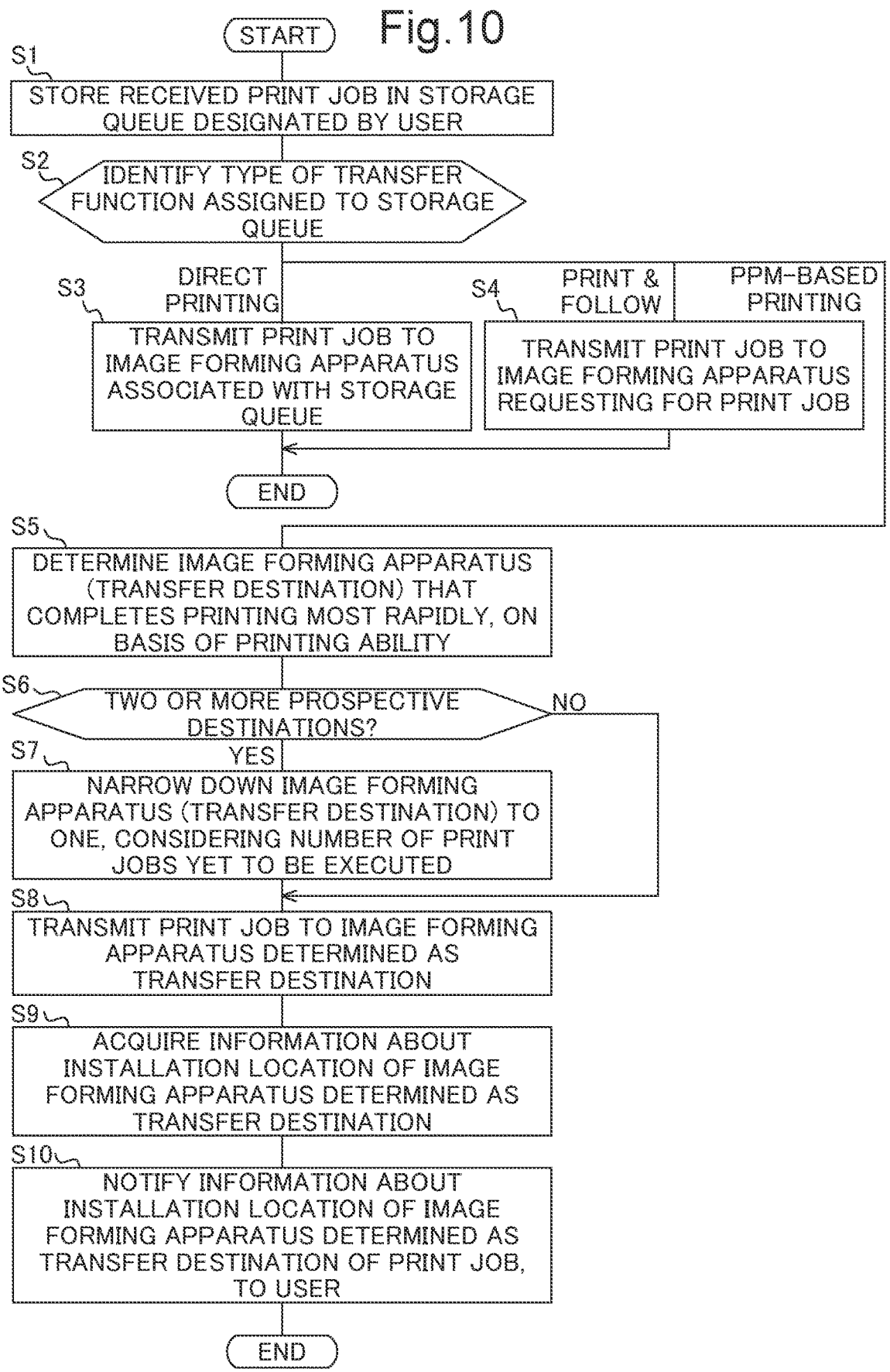
FIG. 10 is a flowchart showing a transfer operation.

Referring now to a flowchart shown in FIG. 10, the transfer operation performed by the management apparatus 3, upon receipt of the print job transmitted from the terminal device 2 via the communication device 32, will be described hereunder.

Upon receipt of the print job transmitted from the terminal device 2 via the communication device 32, the transferer 311 of the management apparatus 3 stores the print job in the storage queue 332 designated by the user of the terminal device 2 (step S1). The transferer 311 identifies the type of the transfer function, assigned in advance to the storage queue 332 in which the print job has been stored (step S2).

In the case of identifying that the type of the transfer function assigned to the storage queue 332 is "Direct Printing" ("Direct Printing" at step S2), the transferer 311 transmits the print job stored in the storage queue 332 to the image forming apparatus 1, registered as the transfer destination in association with the storage queue 332, via the communication device 32 (step S3). After step S3, the transferer 311 finishes the transfer operation.

In the case of identifying that the type of the transfer function assigned to the storage queue 332 is "Print & Follow" ("Print & Follow" at step S2), the transferer 311 transmits the print job stored in the storage queue 332, to the image forming apparatus 1 requesting the transmission of the print job, via the communication device 32 (step S4). After step S4, the transferer 311 finishes the transfer operation.

In the case of identifying that the type of the transfer function assigned to the storage queue 332 is "PPM-Based Printing" ("PPM-Based Printing" at step S2), the transferer 311 determines the image forming apparatus 1 that completes the printing operation based on the print job stored in the storage queue 332 most rapidly (i.e., transfer destination), out of the image forming apparatuses 1 registered as prospective transfer destinations in association with the storage queue 332, on the basis of the printing ability of each of the image forming apparatuses 1 (step S5).

For example, when the image forming apparatuses 1A to 1D are registered as the prospective transfer destinations, and when the print job is specified as "B/W printing on A4 size", the transferer 311 determines that the image forming apparatus 1 that completes the printing operation most rapidly is the image forming apparatus 1 having the ID number "0004" shown in FIG. 4. In contrast, when the print job is specified as "color printing on A4 size", the transferer 311 determines that the image forming apparatuses 1 having the ID number "0001" and "0003" shown in FIG. 4 complete the printing operation most rapidly.

The transferer 311 then decides whether two or more image forming apparatuses 1 have been determined as the prospective transfer destination (step S6). Upon deciding that two or more prospective transfer destinations have been selected (YES at step S6), the transferer 311 narrows the image forming apparatus 1 that completes the printing operation most rapidly to one, using at least one of the number and data amount, of the print jobs scheduled to be executed by the image forming apparatus 1, as the decision criteria (step S7).

For example, when two or more image forming apparatuses 1 of the same print speed are available, the transferer 311 determines the image forming apparatus 1 having the fewest number of print jobs scheduled to be executed, as the transfer destination that completes the printing operation most rapidly, on the basis of the "Current Status" stored in the device information storage region 331.

Then the transferer 311 transmits the print job stored in the storage queue 332, to the image forming apparatus 1 determined as the transfer destination, via the communication device 32 (step S8). Upon receipt of the print job via the network I/F 91, the controller 100 of the image forming apparatus 1 causes the image forming device 12 to execute the printing operation based on the received print job, thereby creating the printed material P, as shown in FIG. 7C.

The notifier 312 acquires the information about the installation location of the image forming apparatus 1 determined as the transfer destination of the print job, on the basis of the information indicating the location of the image forming apparatus 1 and stored in the device information storage region 331, and the map information stored in the map information storage region 330 (step S9), and transmits a notice for notifying the information about the installation location of the image forming apparatus 1 determined as the transfer destination of the print job to the user of the terminal device 2, to the terminal device 2 via the communication device 32 (step S10). After step S10, the transferer 311 finishes the transfer operation.

FIG. 11 illustrates an example of the notice. A notice M1 provided by the notifier 312 includes, in addition to a message to the effect that the print job has been normally transmitted, the device information about the image forming apparatus 1 determined as the transfer destination, and the information about the installation location.

Now, the aforementioned known technique including transmitting the print job to the image forming apparatus most likely to be utilized by the user, out of a plurality of image forming apparatuses, may improve the convenience in use. However, when the image forming apparatus to which the print job has been transmitted is slow in print speed, or when many print jobs are yet to be executed, it is difficult for the user to obtain the printed material at an early stage.

According to the foregoing embodiment, in contrast, when the PPM-based printing function is assigned to the storage queue 332, the image forming apparatus 1 that completes the printing operation most rapidly is selected as the transfer destination, on the basis of the printing ability (e.g., print speed) of each of the plurality of image forming apparatuses 1, and the print job is transferred to such image forming apparatus 1, to be executed thereby. Therefore, the printed material can be outputted at the earliest possible stage. As a result, the user can obtain the printed material at an early stage.

According to the foregoing embodiment, when the transfer destination is narrowed down to one, the print job is transmitted to the image forming apparatus 1 selected as the transfer destination, without a change. However, the disclosure is not limited to such an embodiment. For example, as another embodiment, when many print jobs are yet to be executed by the image forming apparatus 1 that is supposed to complete the printing operation most rapidly, the management apparatus 3 may inquire the user whether the print job may be transmitted to that image forming apparatus 1.

Figure 12:
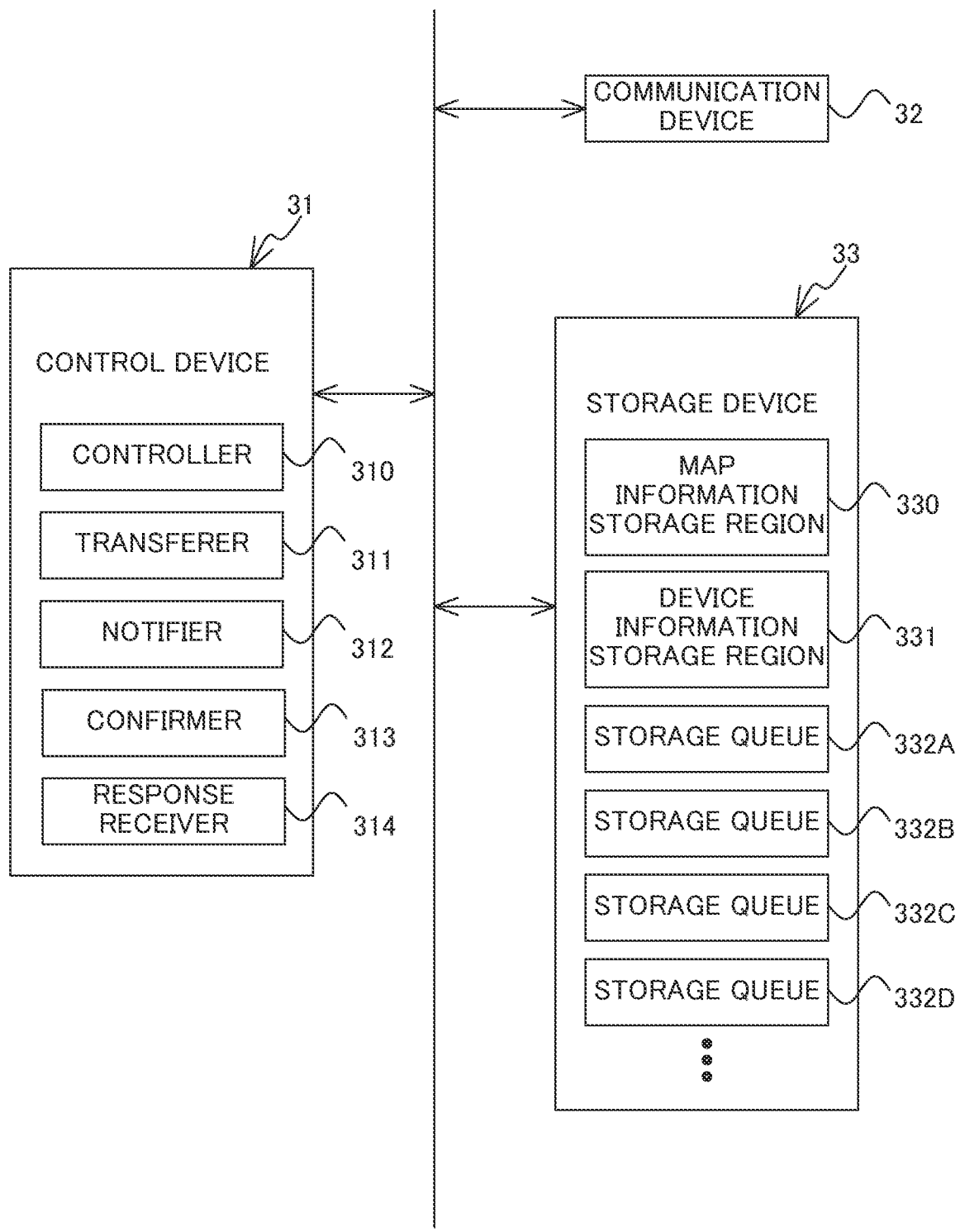
FIG. 12 is a functional block diagram schematically showing another essential internal configuration of a management apparatus.

For example as shown in FIG. 12, the control device 31 of the management apparatus 3 may further act as a confirmer 313 that temporarily holds the print job, when a larger number of print jobs than a predetermined threshold (e.g., five) are scheduled to be executed by the image forming apparatus 1 supposed to complete the printing operation most rapidly, and transmits a confirmation message for confirming whether the print job may be transferred to the image forming apparatus 1, to the terminal device 2, and a response receiver 314 that receives the response to the confirmation message, from the terminal device 2.

As a specific example, the confirmer 313 transmits the confirmation message necessary for the confirmation, to the terminal device 2 via the communication device 32. In the terminal device 2, upon receipt of the confirmation message via the communication device 24, the controller 210 displays, for example, a dialog box for requesting the user to confirm, on the basis of the confirmation message received. The controller 210 stands by for the user's response (OK or NG) to be inputted via the operation device 22, and transmits, upon receipt of the input, the information indicating the user's response to the management apparatus 3, via the communication device 24.

The transferer 311 of the management apparatus 3 transfers the print job, when the response receiver 314 receives the response permitting the transfer, from the terminal device 2 via the communication device 32. On the other hand, when the response receiver 314 receives the response inhibiting the transfer, from the terminal device 2 via the communication device 32, the transferer 311 does not transfer the print job. In this case, the transferer 311 saves the print job in the storage queue 332, and transmits, via the communication device 32, the print job to the image forming apparatus 1 requesting for the print job, as described with reference to the "Print & Follow" function.

As still another embodiment, upon receipt of an instruction, via the operation device 22 of the terminal device 2, to limit the destination of the print job stored in the storage queue 332 to the image forming apparatuses 1 located in the vicinity of the user (i.e., terminal device 2), the controller 210 may transmit the instruction to the management apparatus 3 via the communication device 24. Then the transferer 311 of the management apparatus 3 may determine, upon receipt of the instruction via the communication device 32, the image forming apparatus that completes the printing operation most rapidly, out of the image forming apparatuses 1 located in the vicinity of the user, according to the instruction. In this case, the user can obtain the printed material from the image forming apparatus 1 located in the vicinity of the user.

As still another embodiment, the print controller 211 of the terminal device 2 may transmit, together with the print job, position information indicating the position of the terminal device 2, to the management apparatus 3 via the communication device 24, so that, upon receipt of the print job and the position information via the communication device 32, the transferer 311 of the management apparatus 3 may determine the image forming apparatus 1 that completes the printing operation most rapidly, out of the image forming apparatuses 1 located inside a predetermined region around the position indicated by the position information. Such an arrangement excludes the image forming apparatuses 1 located distant from the user from the prospective transfer destination, thereby further improving the convenience in use.

As still another embodiment, the transferer 311 of the management apparatus 3 may transmit, together with the print job, a priority command to execute the print job with priority, to the image forming apparatus 1 that completes the printing operation most rapidly, via the communication device 32, so that, upon receipt of the print job and the priority command via the network I/F 91, the controller 100 of the image forming apparatus 1 may cause the image forming device 12 to execute the printing operation based on the print job received together with the priority command, with priority to other print jobs received earlier and yet to be executed.

The disclosure may be modified in various manners, without limitation to the configuration according to the foregoing embodiment. For example, although the image forming apparatus constituting the image forming system according to the disclosure is exemplified by a multifunction peripheral in the embodiment, a different type of image forming apparatus having a printing function may be employed.

The configurations and processings according to the foregoing embodiments, described with reference to FIG. 1 to FIG. 12, are merely exemplary and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An image forming system comprising:
a terminal device;
a management apparatus; and
a plurality of image forming apparatuses,
the terminal device including:
a first communication device that communicates with the management apparatus; and
a first control device including a processor, and configured to act, when the processor executes a first control program, as a print controller that generates a print job based on a document to be printed, and transmits the print job to the management apparatus, via the first communication device, the management apparatus including:
- a second communication device that communicates with the terminal device and the plurality of image forming apparatuses;
- a storage queue; and
- a second control device including a processor, and configured to act, when the processor executes a second control program, as a transferer that:
  - stores, upon receipt of the print job transmitted from the terminal device via the second communication device, the print job in the storage queue; and
  - performs a first transfer operation including determining one of the plurality of image forming apparatuses that completes a printing operation based on the print job most rapidly, as transfer destination, on a basis of printing ability of each of the plurality of image forming apparatuses, and transmitting the print job to the image forming apparatus determined as the transfer destination, via the second communication device, the plurality of image forming apparatuses each include:
- a third communication device that communicates with the management apparatus;
- an image forming device that executes the printing operation including forming an image on a recording medium; and
- a third control device including a processor, and configured to act, when the processor executes a third control program, as a controller that causes the image forming device, upon receipt of the print job transmitted from the management apparatus via the third communication device, to execute the printing operation based on the print job, wherein the second control device of the management apparatus further acts as a notifier that notifies information representing that the print job has been normally transmitted and information of an installation location of the image forming apparatus determined as the transfer destination, to a user of the terminal device.

2. The image forming system according to claim 1, wherein the transferer of the management apparatus determines the image forming apparatus as the transfer destination, by utilizing at least one of a number of print jobs scheduled to be executed, and data amount of the print jobs scheduled to be executed, included in the printing ability, as decision criteria.

3. The image forming system according to claim 1, wherein the transferer of the management apparatus transmits, together with the print job, a priority command to execute the print job with priority, to the image forming apparatus determined as the transfer destination, via the second communication device, and upon receipt of the print job and the priority command via the third communication device, the controller of the image forming apparatus causes the image forming device to execute the printing operation based on the print job received together with the priority command, with priority to other print jobs yet to be executed.

4. The image forming system according to claim 1, wherein the print controller of the terminal device transmits, together with the print job, position information indicating a position of the terminal device, to the management apparatus via the first communication device, and upon receipt of the print job and the position information via the second communication device, the transferer of the management apparatus determines the image forming apparatus as the transfer destination, out of the image forming apparatuses located inside a predetermined region around the position indicated by the position information.

5. The image forming system according to claim 1, wherein the management apparatus includes a plurality of the storage queues, the transferer of the management apparatus registers in advance one or more image forming apparatuses as prospective transfer destinations of the print job, in association with each of the plurality of the storage queues, and the transferer of the management apparatus determines the image forming apparatus as the transfer destination, out of the prospective transfer destinations.

6. An image forming system comprising:
a terminal device;
a management apparatus; and
a plurality of image forming apparatuses,
the terminal device including:
- a first communication device that communicates with the management apparatus; and
- a first control device including a processor, and configured to act, when the processor executes a first control program, as a print controller that generates a print job based on a document to be printed, and transmits the print job to the management apparatus, via the first communication device, the management apparatus including:
- a second communication device that communicates with the terminal device and the plurality of image forming apparatuses;
- a storage queue; and
- a second control device including a processor, and configured to act, when the processor executes a second control program, as a transferer that:
  - stores, upon receipt of the print job transmitted from the terminal device via the second communication device, the print job in the storage queue; and
  - performs a first transfer operation including determining one of the plurality of image forming apparatuses that completes a printing operation based on the print job most rapidly, as transfer destination, on a basis of printing ability of each of the plurality of image forming apparatuses, and transmitting the print job to the image forming apparatus determined as the transfer destination, via the second communication device, the plurality of image forming apparatuses each include:
- a third communication device that communicates with the management apparatus;
- an image forming device that executes the printing operation including forming an image on a recording medium; and
- a third control device including a processor, and configured to act, when the processor executes a third control program, as a controller that causes the image forming device, upon receipt of the print job transmitted from the management apparatus via the third communication device, to execute the printing operation based on the print job, wherein the second control device of the management apparatus further acts as:

a confirmer that temporarily holds the print job, when a larger number of print jobs than a predetermined threshold are scheduled to be executed by the image forming apparatus determined as the transfer destination, and transmits a confirmation message for confirming whether the print job may be transferred to the image forming apparatus, to the terminal device; and a response receiver that receives a response to the confirmation message, from the terminal device, and the transferer of the management apparatus transmits the print job to the image forming apparatus via the second communication device, when the response received by the response receiver permits the transfer.

7. An image forming system comprising:
a terminal device;
a management apparatus; and
a plurality of image forming apparatuses,
the terminal device including:
  a first communication device that communicates with the management apparatus; and
  a first control device including a processor, and configured to act, when the processor executes a first control program, as a print controller that generates a print job based on a document to be printed, and transmits the print job to the management apparatus, via the first communication device,
the management apparatus including:
  a second communication device that communicates with the terminal device and the plurality of image forming apparatuses;
  a storage queue; and
  a second control device including a processor, and configured to act, when the processor executes a second control program, as a transferer that:
    stores, upon receipt of the print job transmitted from the terminal device via the second communication device, the print job in the storage queue; and
    performs a first transfer operation including determining one of the plurality of image forming apparatuses that completes a printing operation based on the print job most rapidly, as transfer destination, on a basis of printing ability of each of the plurality of image forming apparatuses, and transmitting the print job to the image forming apparatus determined as the transfer destination, via the second communication device,
the plurality of image forming apparatuses each include:
  a third communication device that communicates with the management apparatus;
  an image forming device that executes the printing operation including forming an image on a recording medium; and
  a third control device including a processor, and configured to act, when the processor executes a third control program, as a controller that causes the image forming device, upon receipt of the print job transmitted from the management apparatus via the third communication device, to execute the printing operation based on the print job,
wherein the management apparatus includes a plurality of the storage queues,
the transferer of the management apparatus assigns in advance one of a plurality of transfer functions, including a PPM-based printing function for executing the first transfer operation, to each of the plurality of the storage queues, and transmits the print job stored in the storage queue to one of the plurality of image forming apparatuses, according to the transfer function assigned to the storage queue, the terminal device further includes an operation device for receiving an instruction of a user, and the print controller of the terminal device transmits, upon receipt of the instruction to designate one of the plurality of the storage queues via the operation device, an instruction to store the print job in the designated storage queue, and the print job, to the management apparatus via the first communication device.

8. The image forming system according to claim 7,
wherein the transferer of the management apparatus executes:
the first transfer operation, when the PPM-based printing function is assigned to the storage queue;
a second transfer operation including transmitting the print job, when a direct print function is assigned to the storage queue, to the image forming apparatus registered in advance in association with the storage queue, via the second communication device; and
executes a third transfer operation including transmitting the print job, when a print-and-follow function is assigned to the storage queue, to the image forming apparatus requesting transmission of the print job, via the second communication device.

9. An image forming method to be executed by an image forming system including a terminal device, a plurality of image forming apparatuses, and a management apparatus, the method comprising:
  a step in which the terminal device generates a print job based on a document to be printed, and transmits the print job to the management apparatus, via a first communication device that communicates with the management apparatus;
  a step in which the management apparatus receives the print job transmitted from the terminal device, via a second communication device that communicates with the terminal device and the plurality of image forming apparatuses, and stores the print job in a storage queue;
  a step in which the management apparatus performs a first transfer operation including determining one of the plurality of image forming apparatuses that completes a printing operation based on the print job most rapidly, as transfer destination, on a basis of printing ability of each of the plurality of image forming apparatuses, and transmitting the print job to the image forming apparatus determined as the transfer destination, via the second communication device;
  a step in which the image forming apparatus determined as the transfer destination receives the print job transmitted from the management apparatus, via a third communication device that communicates with the management apparatus, and causes an image forming device that executes the printing operation including forming an image on a recording medium, to execute the printing operation based on the print job; and
  a step in which the management apparatus notifies information representing that the print job has been normally transmitted and information of an installation location of the image forming apparatus determined as the transfer destination, to a user of the terminal device.

* * * * *